(12) United States Patent
Vaknine et al.

(10) Patent No.: US 9,368,285 B1
(45) Date of Patent: Jun. 14, 2016

(54) POWER CELL EMBEDDED IN ENCLOSURE

(71) Applicant: AMAZON TECHNOLOGIES, INC., Reno, NV (US)

(72) Inventors: Erik Avy Vaknine, San Jose, CA (US); Lifeng Cui, Palo Alto, CA (US); Robert Nasry Hasbun, Fall City, WA (US); Yuting Yeh, Sunnyvale, CA (US); Poon-Keong Ang, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 269 days.

(21) Appl. No.: 13/827,282

(22) Filed: Mar. 14, 2013

Related U.S. Application Data

(60) Provisional application No. 61/770,220, filed on Feb. 27, 2013.

(51) Int. Cl.
| | |
|---|---|
| *H01G 9/15* | (2006.01) |
| *H01M 2/02* | (2006.01) |
| *H01M 2/06* | (2006.01) |

(52) U.S. Cl.
CPC ............ *H01G 9/15* (2013.01); *H01M 2/0202* (2013.01); *H01M 2/024* (2013.01); *H01M 2/06* (2013.01)

(58) Field of Classification Search
None
See application file for complete search history.

(56) References Cited

U.S. PATENT DOCUMENTS

| | | | | |
|---|---|---|---|---|
| 5,322,745 | A * | 6/1994 | Yanagihara et al. | 429/59 |
| 2007/0015048 | A1* | 1/2007 | Lee | H01M 4/62 |
| | | | | 429/118 |
| 2007/0015061 | A1* | 1/2007 | Klaassen | H01M 4/13 |
| | | | | 429/322 |
| 2007/0088394 | A1* | 4/2007 | Jacobson | 607/4 |
| 2008/0096098 | A1* | 4/2008 | Shirakata et al. | 429/94 |
| 2008/0169785 | A1* | 7/2008 | Kim | H01M 10/4207 |
| | | | | 320/124 |
| 2009/0035662 | A1* | 2/2009 | Scott et al. | 429/231.5 |
| 2009/0269661 | A1* | 10/2009 | Mori et al. | 429/166 |
| 2010/0003584 | A1* | 1/2010 | Dougherty et al. | 429/72 |
| 2011/0169481 | A1* | 7/2011 | Nguyen | H01M 2/1055 |
| | | | | 324/126 |
| 2011/0195291 | A1* | 8/2011 | Yokoyama | H01M 2/1094 |
| | | | | 429/99 |
| 2013/0078495 | A1* | 3/2013 | Chiu | 429/120 |

* cited by examiner

*Primary Examiner* — Scott J Chmielecki
(74) *Attorney, Agent, or Firm* — Lindauer Law, PLLC

(57) ABSTRACT

An embedded power cell is formed by placing a cathode, anode, and electrolyte within a recess in an enclosure. The enclosure thus acts as part of an overall device and also contains the embedded power cell, eliminating the need for dedicated packaging for the power cell. In one implementation, a low-profile lithium ion battery with a polymerized electrolyte may be sealed within the enclosure. Other devices such as a cell temperature sensor, battery controller, and so forth may also be embedded within the enclosure.

20 Claims, 9 Drawing Sheets

POWER CELL EMBEDDED IN ENCLOSURE

PRIORITY

The present application claims priority to U.S. Provisional Application Ser. No. 61/770,220, filed on Feb. 27, 2013 entitled "Power Cell Embedded in Enclosure." This provisional application is herein incorporated by reference in its entirety, and the benefit of the filing date of this provisional application is claimed to the fullest extent permitted.

BACKGROUND

A wide variety of devices use electrical power during operation. For many reasons, the overall size of these devices continues to decrease. Traditional power cells add volumetric bulk as well as mass due to the packaging material of the power cells.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A wide variety of stationary, mobile, or portable devices operate using electrical power. These devices may include test equipment, telemetry devices, smartphones, tablet computers, laptops, electric vehicles, lighting, and so forth. Power cells may be used to provide electrical power to these devices. The power cells may include galvanic cells, fuel cells, capacitors, betavoltaic generators, alphavoltaic generators, and so forth.

Traditionally, power cells have been provided as packs or units which are connected to other devices during assembly of the device. To maintain the integrity of the power cell, the packs are encapsulated within their own packaging. However, this packaging increases the bulk or volume of the power cell, increases overall weight, and so forth.

In some applications it may be desirable to reduce overall size of the device, minimize the overall weight of the device, and so forth. Described in this disclosure are devices and techniques for embedding one or more power cells within at least a portion of an enclosure. The enclosure is thus configured to act as at least a portion of the packaging for the power cell. This reduces or eliminates the need for packaging material for the power cell, which may reduce weight, volume, or both.

Illustrative System

Figure 1:
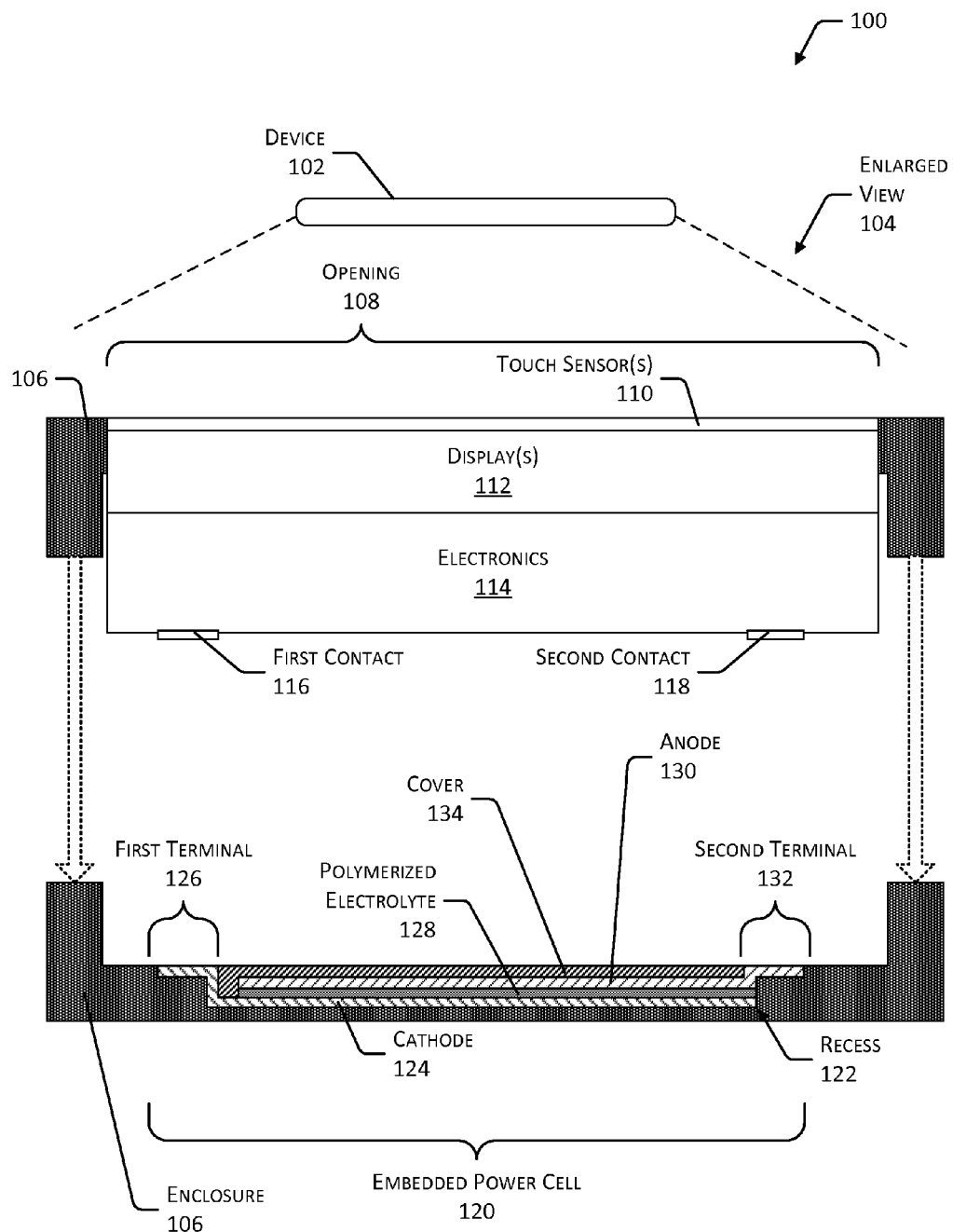
FIG. 1 is a side view of a device with a power cell embedded in a recess within an enclosure.

FIG. 1 is a side view 100 of a device 102. The device 102 may include test equipment, telemetry devices, medical devices, smartphones, tablet computers, laptops, electric vehicles, lighting, and so forth. An enlarged view 104 of the device 102 is presented.

The device 102 comprises an enclosure 106 having one or more pieces. The enclosure 106 may be configured to hold or contain one or more components of the device 102. The enclosure 106 may comprise one or more materials including carbon fiber composite, plastic, ceramic, metal, and so forth. For illustration and not by way of limitation, the enclosure 106 is depicted as having a generally rectangular shape, but in other implementations the enclosure 106 may have other shapes, such as one or more curved surfaces. For example, the enclosure 106 may be spherical. The materials used in the enclosure 106 may include electrically non-conductive materials, such as plastics, ceramics, and so forth.

One or more openings 108 in the enclosure 106 may expose at least a portion of the one or more components to an outside environment. For example, the opening 108 may be provided for one or more touch sensors 110, one or more displays 112, data connectors, power connectors, and so forth. The one or more touch sensors 110 may be force sensitive resistors, capacitive sensors, optical sensors, acoustic sensors, and so forth. The touch sensor 110 may be configured to determine a location of one or more touches. The one or more displays 112 may include electrophoretic displays, liquid crystal displays, interferometric displays, cholesteric displays, light emitting diode displays, projection displays, and so forth.

The device 102 also includes other electronics 114. The electronics 114 may comprise one or more processors, memory, input/output devices, communication interfaces, and so forth. The touch sensor 110, display 112, and the electronics 114, and other devices may use electricity during operation. The electricity may be transferred to the electronics 114 using one or more contacts, such as a first contact 116 and a second contact 118. These contacts 116 may be pads, pogo pins, spring contacts, and so forth. The contacts 116 are configured to provide an electrically conductive pathway with one or more embedded power cells 120. The device 102 may be configured to operate at least in part from power provided by the power embedded power cell 120.

The embedded power cell 120 is arranged within a recess 122 in a portion of the enclosure 106. Interior sides of the recess 122 thus may act as packaging for the embedded power cell 120. In this way, the packaging which would otherwise be used to enclose the cell may be omitted. The recess 122 may be formed by molding, milling, vacuum forming, injection molding, die forming, selective deposition, sintering, photopolymerization, and so forth. For example, a carbon fiber enclosure 106 may be milled using a cutting head to remove material, forming the recess 122. In another example, prior to firing, a ceramic material may be molded into a shape which includes the recess 122. The recess 122 thus describes a volume which would otherwise be within the enclosure 106.

In some implementations the embedded power cell 120 may extend at least partly beyond the recess 122.

A cathode 124 is arranged within the recess 122. The cathode 124 may comprise a foil, plate, or other structure which is placed within the recess 122. The placement may include mechanical positioning, pouring, filling, printing, vapor deposition, lamination, spraying, jet deposition, and so forth. For example, a screen printing process may be used to deposit the cathode 124. In another example, jet deposition may be used to print the cathode 124 onto the part of the enclosure 106 at the bottom of the recess 122.

In some implementations the cathode 124 may comprise aluminum, such as an aluminum film. The aluminum may in turn be coated at least in part with $LiCoO_2$ or $LiMn_2O_4$. The aluminum film may be laminated, adhered, or otherwise bonded to at least a portion of the enclosure 106. In one implementation, the cathode 124 may be about 100 microns in thickness, that is, along the Z axis illustrated here. In other implementations, other thicknesses which are larger or smaller may be used.

The cathode 124 may be configured to couple to, or otherwise provide, a first terminal 126. For example, the cathode 124 material may extend upward from the recess 122 and out onto an inner surface of the enclosure 106. The first terminal 126 may comprise one or more pads, pogo pins, spring contacts, and so forth. The first terminal 126 may be coupled to the first contact 116 when the device 102 is assembled, providing an electrically conductive pathway.

A polymerized electrolyte 128 is also arranged within the recess 122 and in contact with at least a portion of the cathode 124. The polymerized electrolyte 128 may comprise polyvinylidene fluoride, polyethyleneoxide, polyaniline, and so forth. The coupling of the polymerized electrolyte 128 may comprise placing the polymerized electrolyte 128 such that at least a portion of one side is in physical contact with at least a portion of the cathode 124. In one implementation, the polymerized electrolyte 128 may be about 100 microns in thickness, that is, along the Z axis illustrated here. In other implementations, other thicknesses which are larger or smaller may be used.

An anode 130 is also arranged within the recess 122 and in contact with at least a portion of the polymerized electrolyte 128. As described above, the arrangement within the recess 122 may include mechanical positioning, pouring, filling, printing, vapor deposition, lamination, spraying, jet deposition, and so forth.

At least a portion of the materials used in the enclosure 106 may be non-reactive to chemical compounds or other materials, such as battery electrolytes and other materials in the embedded power cell 120. In some implementations, the sides and bottom of the recess 122 may be lined with a non-reactive or corrosion resistant material, such as a ceramic or plastic. This lining may also enable the use of an enclosure 102 which is otherwise electrically conductive, such as a metal, while preventing the embedded power cell 120 from being shorted when installed in the recess 122. For example, one or more layers of ceramic may be deposited within the recess 122 formed in a magnesium enclosure 106.

The anode 130 may comprise a copper film coated with carbon, such as graphite. The coupling of the anode 130 to the polymerized electrolyte 128 may comprise placing the anode 130 such that at least a portion of one side is in physical contact with at least a portion of the polymerized electrolyte 128. In one implementation, the anode 130 may be about 100 microns in thickness, that is, along the Z axis illustrated here. In other implementations, other thicknesses which are larger or smaller may be used.

The anode 130 may be configured to couple to, or otherwise provide, a second terminal 132. For example, the anode 130 material may extend upward from the recess 122 and out onto an inner surface of the enclosure 106. The second terminal 132 may comprise one or more pads, pogo pins, spring contacts, and so forth. The second terminal 132 may be coupled to the second contact 118 when the device 102 is assembled, providing an electrically conductive pathway.

The enclosure 106, or a portion thereof, may be configured to be non-reactive to components of the embedded power cell 120, such as the cathode 124, the polymerized electrolyte 128, and the anode 130. The enclosure 106 may comprise non-reactive material, or may be coated or configured with a non-reactive material. For example, an enclosure 106 made from a metal such as magnesium may have insulating and chemically resistant enamel deposited within the recess 122.

A cover 134 is coupled to at least a portion of the enclosure 106 and is configured to seal the recess 122. For example, the first terminal 126 and the second terminal 132 may be left exposed. Sealing may create a barrier which keeps the materials of the embedded power cell 120 within the recess 122, prevents contaminants from intruding into the embedded power cell 120, and so forth. For example, the seal may provide a barrier between an ambient atmosphere surrounding the device and the components of the embedded power cell 120 within the recesses 122. The cover 134 may comprise the same material as the enclosure 106, or a different material. The cover 134 may comprise a material applied as a piece, such as a sheet. For example, polytetrafluoroethylene may be used. The piece may be applied with an adhesive, laminated, ultrasonically welded, laser welded, and so forth to the enclosure 106. For example, an adhesive material may be applied to a portion of the enclosure 106, the cover 134, or both, and the two joined to form the seal.

In some implementations the cover 134 may comprise material applied as a liquid or gel which is configured to solidify. The liquid or gel may solidify upon application of an oxidizing agent, exposure to light, over time, and so forth. For example, a liquid epoxy resin may be used which is applied and then heated to cure and harden. The cover 134 may be configured to provide a surface which is generally flush with an interior surface of the enclosure 106. The interior surface of the enclosure 106 is that surface which is, when the enclosure 106 is complete, inside the device 102. In other implementations, the cover 134 may be placed atop at least a portion of the interior surface of the enclosure 106. In yet another implementation, at least a portion of one of the electrodes, such as the anode 130, may be configured to act as the cover 134.

The cover 134 may be configured to allow for coupling between the cathode 124, the anode 130, and the first terminal 126 and the second terminal 132 which extend beyond or outside the cover 134 and past or onto the interior surface of the enclosure 106. For example, the cover 134 may include slits, cutouts, or may be placed atop a circuit trace which couples the cathode 124 and the first terminal 126.

The cover 134 may be configured to be flexible, or otherwise allow for some deformation. In some implementations, the embedded power cell 120 may physically swell or shrink in size based on a level of charge. The cover 134 may be configured to allow this expansion or contraction while maintaining the seal of the embedded power cell 120. A corresponding volume to allow for expansion may be provided within the interior of the device 102.

The embedded power cell 120 comprises the cathode 124, the polymerized electrolyte 128, the anode 130, and is sealed within the recess 122 by the cover 134. When the enclosure 106 is assembled, the first contact 116 comes in electrical contact with the first terminal 126, while the second contact 118 comes in electrical contact with the second terminal 132. Once in contact, the electrically conductive pathways allow for the transfer of electrical current between the embedded power cell 120 and the touch sensor 110, the display 112, or the other electronics 114 within the device 102. For example, a battery controller in the electronics 114 may be configured to receive external power and charge the embedded power cell 120.

In this and subsequent illustrations a directional reference is depicted in which three mutually orthogonal axes are designated as X, Y, and Z. These axes are included for ease of illustration and discussion, and not by way of limitation. Furthermore, the components depicted may be implemented with different relative sizes or proportions other than those depicted here. For example, the relative sizes of the first terminal 126 and the second terminal 128 may differ.

Figure 2:
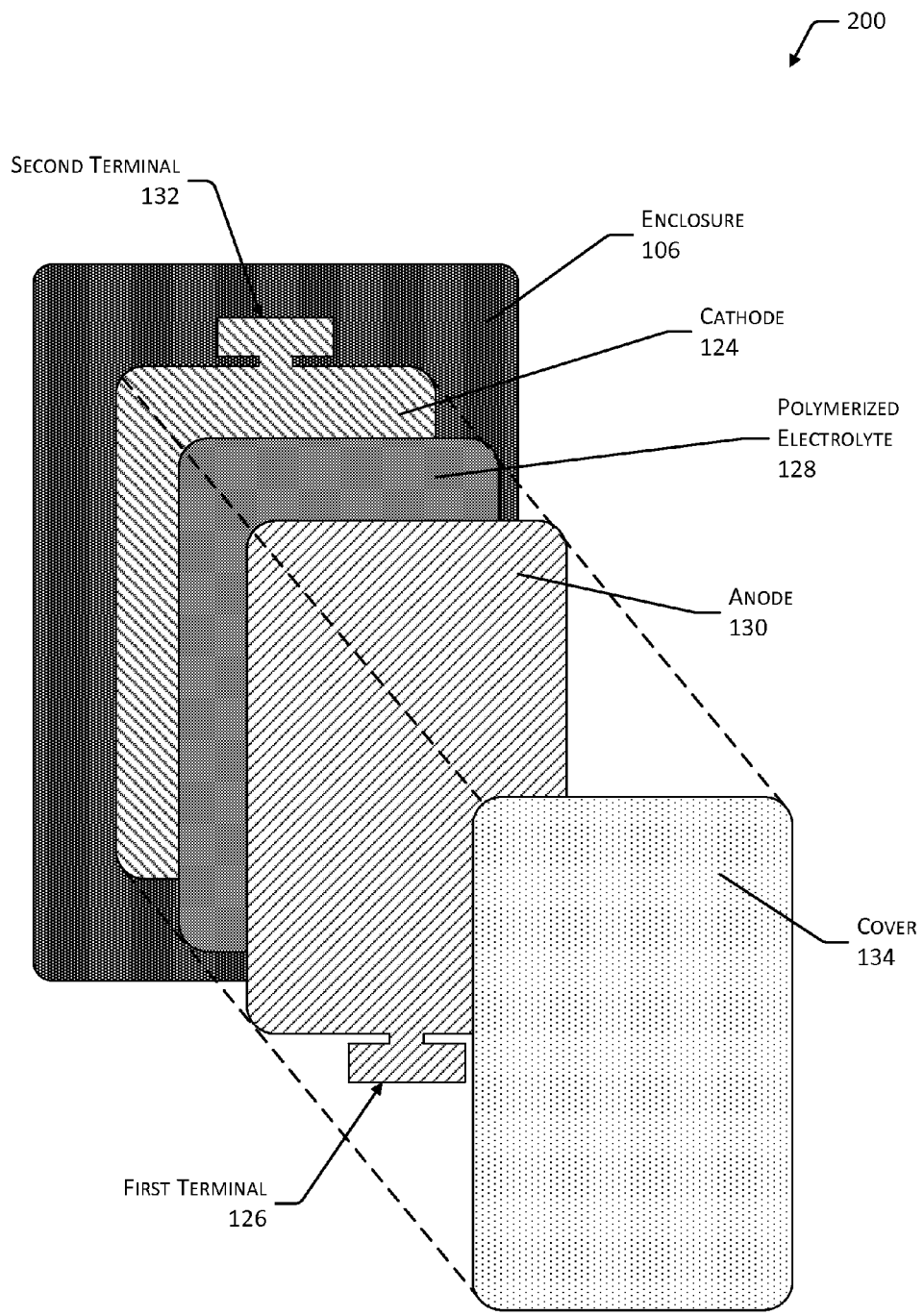
FIG. 2 is an expanded view of a portion of the device, depicting the various layers of the embedded power cell having a polymerized electrolyte.

FIG. 2 is an expanded view 200 of a portion of the device 102, depicting the various layers of the embedded power cell 120. This view 200 comprises an orthographic projection. In this illustration, a stackup of the enclosure 106 within the recess 122, the cathode 124, the polymerized electrolyte 128, the anode 130, and the cover 134 are shown. The first terminal 126 and the second terminal 132 are depicted, each as a single tab extending from the body of the cathode 124 and the anode 130, respectively. In other implementations the geometry and count of the first terminal 126, the second terminal 132, or both may differ. For example, the first terminal 126 may be circular while the second terminal 132 is rectangular.

Figure 3:
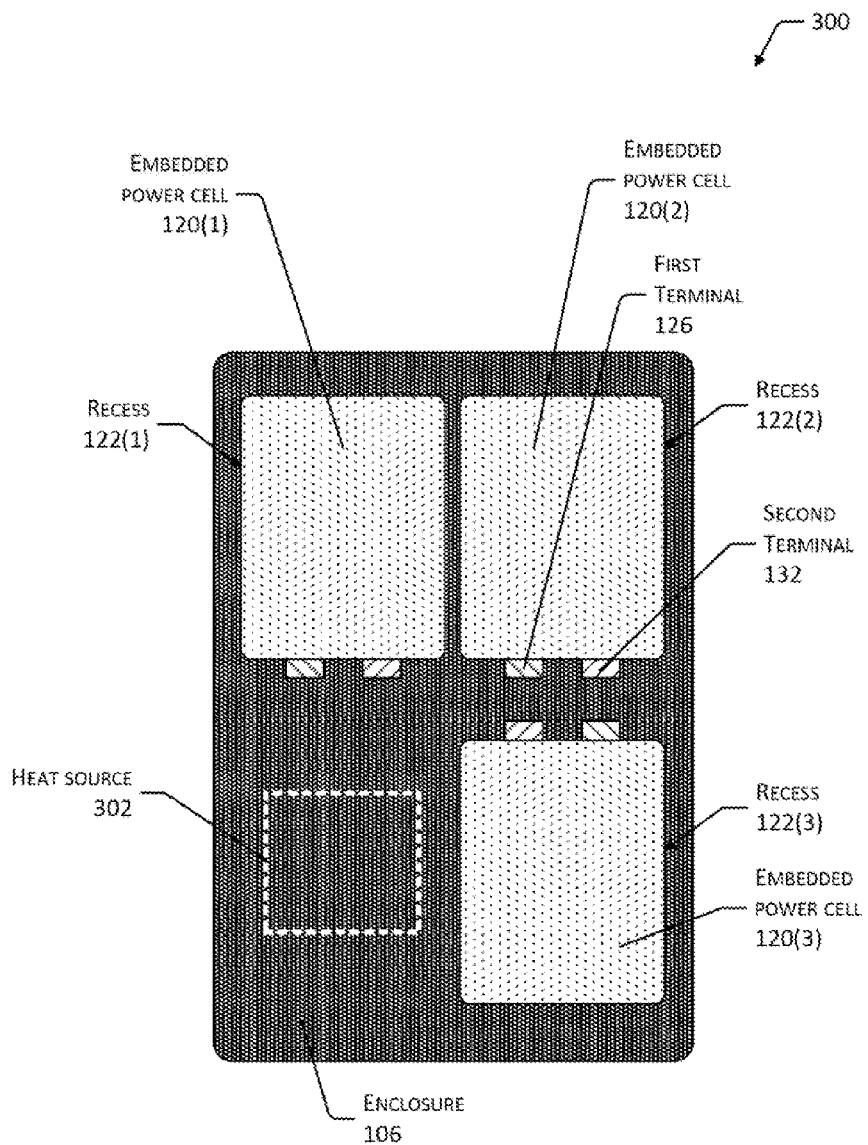
FIG. 3 is a top or plan view of the device illustrating multiple recesses within which power cells may be embedded.

FIG. 3 is a top or plan view 300 of the device 102 illustrating multiple recesses 122 within which power cells may be embedded. In some implementations a plurality of embedded power cells 120 may be provided to improve fault tolerance, increase power capacity, and so forth.

In this illustration, three recesses 122(1), 122(2), and 122 (3) are shown arranged in three quadrants of the enclosure 106. These recesses 122 are depicted as being generally rectangular, however in other implementations the recesses 122 may describe shapes which may be regular or irregular. For example, a single recess 122 maybe be arranged in an "L" shape. The recesses 122 may be different shapes or sizes. The recesses 122(1)-(3) contain embedded power cells 120(1)-(3). In this illustration, the first terminal 126 and the second terminal 132 for each of the embedded power cells 120 are arranged towards the middle of an X-Y plane described by the enclosure 106. In some implementations, interconnections may be made between the embedded power cells 120 to provide for a series circuit of multiple embedded power cells 120.

Placement of the one or more recesses 122 within the enclosure 106 may be based at least in part on factors such as thermal loads. Operation of some components, such as processors, power handling equipment, amplifiers, and so forth, may result in one or more heat sources 302 within the device 102.

In one implementation, the one or more recesses 122 and thus the one or more embedded power cells 120 may be configured to be proximate to the one or more heat sources such that thermal energy from the heat source 302 is coupled at least in part to the embedded power cells 120. The thermal energy may then be dissipated from the heat source 302 by using the embedded power cell 120, or a portion thereof, as a heat sink. Additionally, the transfer of thermal energy to the embedded power cell 120 may also improve performance. For example, the thermal energy may serve to warm the embedded power cell 120 in cold environments.

In another implementation, the one or more recesses 122 and thus the one or more embedded power cells 120 may be configured to be distal, or away from, the one or more heat sources 302. For example, as depicted here the hot spot 302 may be in the lower left quadrant. Where the embedded power cell 120 may be sensitive to overheating, no recess 122 is positioned in this quadrant.

Placement of the one or more recesses 122 within the enclosure 106 may be based at least in part on mass distribution within the device 102. The recesses 122 and the corresponding embedded power cells 120 may be distributed to arrange a center-of-mass of the device 102 to a particular point.

Figure 4:
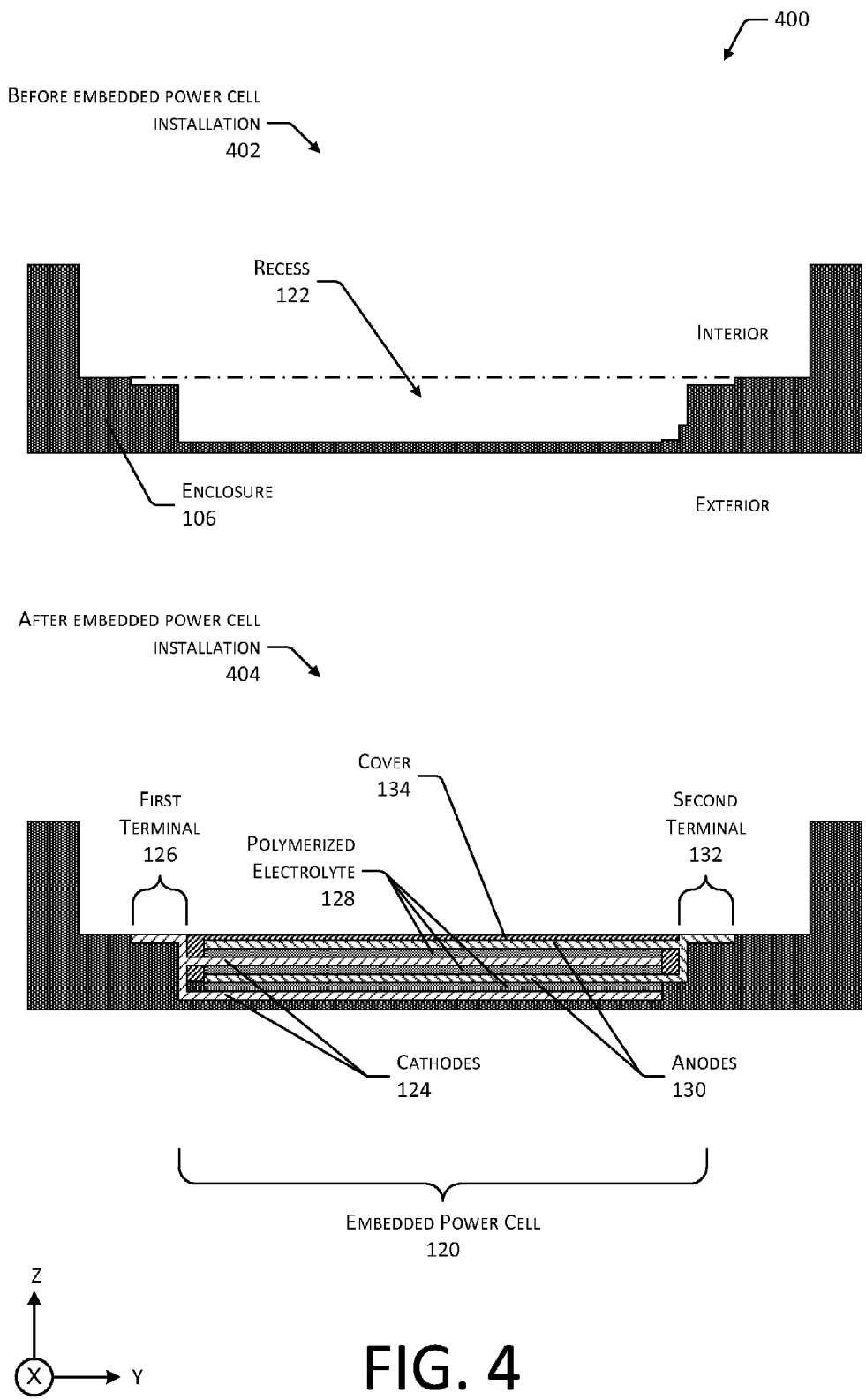
FIG. 4 is a side view of a device with a multi-layer power cell embedded in a recess of an enclosure.

FIG. 4 is a side view 400 of another implementation of the embedded power cell 120. The enclosure 106 is depicted before embedded power cell installation 402. The recess 122 is presented, as is a broken line indicating a plane of the inner surface of the enclosure 106. For example, the broken line may be indicative of where the material of the enclosure 106 was prior to a milling operation to form the recess 122. As shown in this cross section, the enclosure 106 may be contoured to provide space for the components of the embedded power cell 120.

After the embedded power cell installation 404, a multiple layer embedded power cell 120 is depicted. In this implementation, a plurality of cathodes 124, polymerized electrolyte 128 layers, and anodes 130 are depicted. The multiple layer embedded power cell 120 may be used to provide greater power capacity.

In other implementations a plurality of separate cells may be emplaced into the same recess 122. These separate cells may be stacked atop one another along the Z axis, side-by-side along the X or Y axes, or a combination thereof. These separate cells may have different compositions. For example, one cell within the recess 122 may be rechargeable while another is not.

Figure 5:
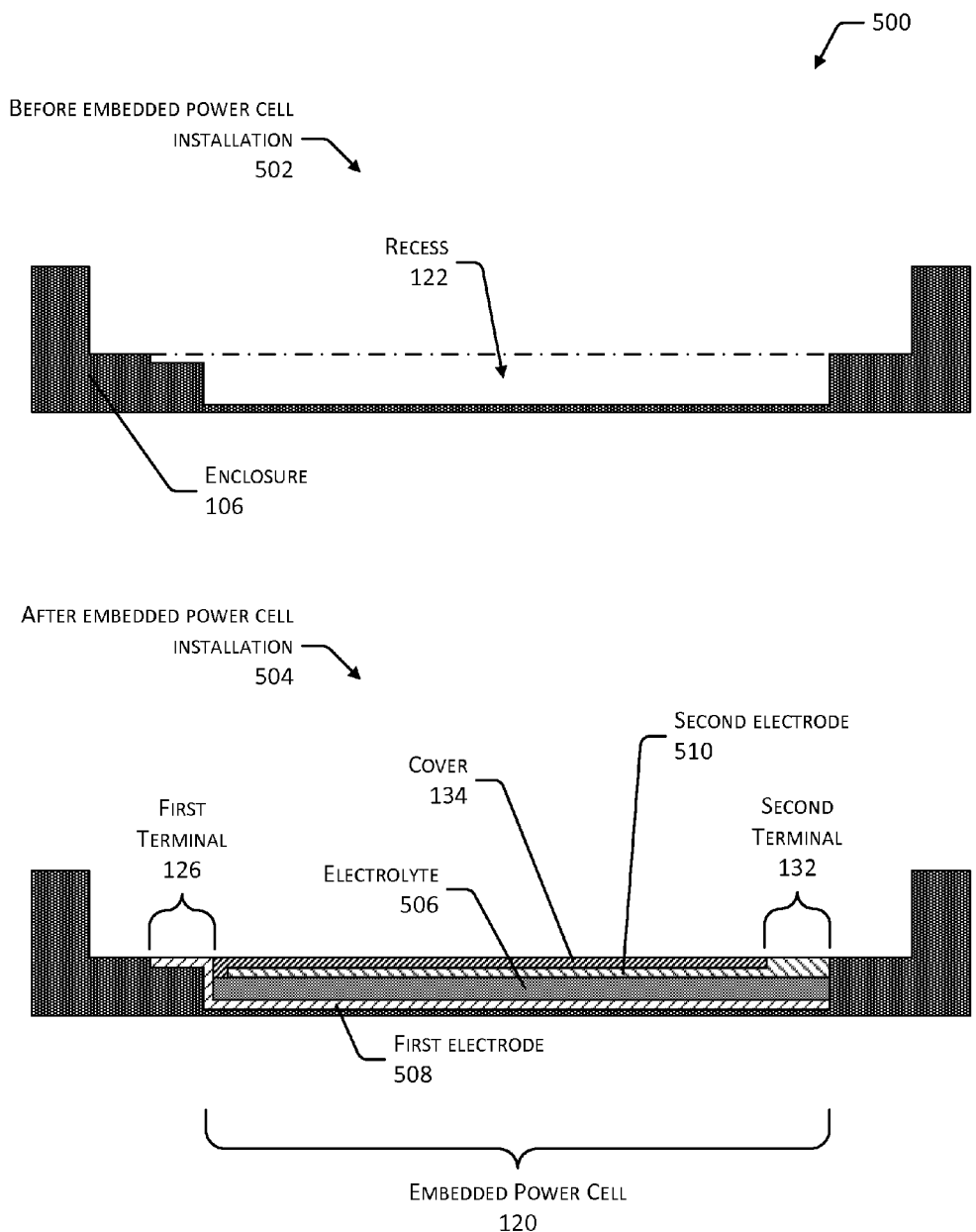
FIG. 5 is a side view of an embedded power cell using a non-polymer electrolyte.

FIG. 5 is a side view 500 of another implementation of the embedded power cell using a non-polymer electrolyte. The enclosure 106 is depicted before embedded power cell installation 502. The recess 122 is presented, as is a broken line indicating a plane of the inner surface of the enclosure 106. As shown in this cross section, the enclosure 106 may be contoured to provide space for the components of the embedded power cell 120. The interior sides of the recess 122 are thus configured to contain the embedded power cell 120. Because of the differences in construction between the embedded power cell 120 depicted in FIGS. 1 and 4, the contours of the respective recesses 122 differ.

After the embedded power cell installation 504 the embedded power cell 120 is depicted with a non-polymerized electrolyte 506 arranged between a first electrode 508 and a second electrode 510. In some implementations a ceramic separator may be used as a matrix to contain the electrolyte 506. The electrolyte 506 may be a liquid, slurry, paste, and so forth. In some implementations the electrolyte 506 may be in aqueous form.

As described above, the terminals of the embedded power cell 120 may be arranged in different locations. In some implementations, one or both of the terminals may be arranged atop at least a portion of the electrolyte 506. For example, as depicted here the second terminal 132 is arranged atop the electrolyte 506, while the first terminal 126 is not. In these implementations, the cover 134 may be configured with one or more holes, penetrations, or conductive portions which are configured to allow an electrically conductive pathway to the cathode(s) 124 and the anode(s) 130. As described above, in some implementations one of the electrodes may function both as an electrode and as the cover 134. For example, as shown here, the second electrode 510 may be configured to serve as the cover 134.

Figure 6:
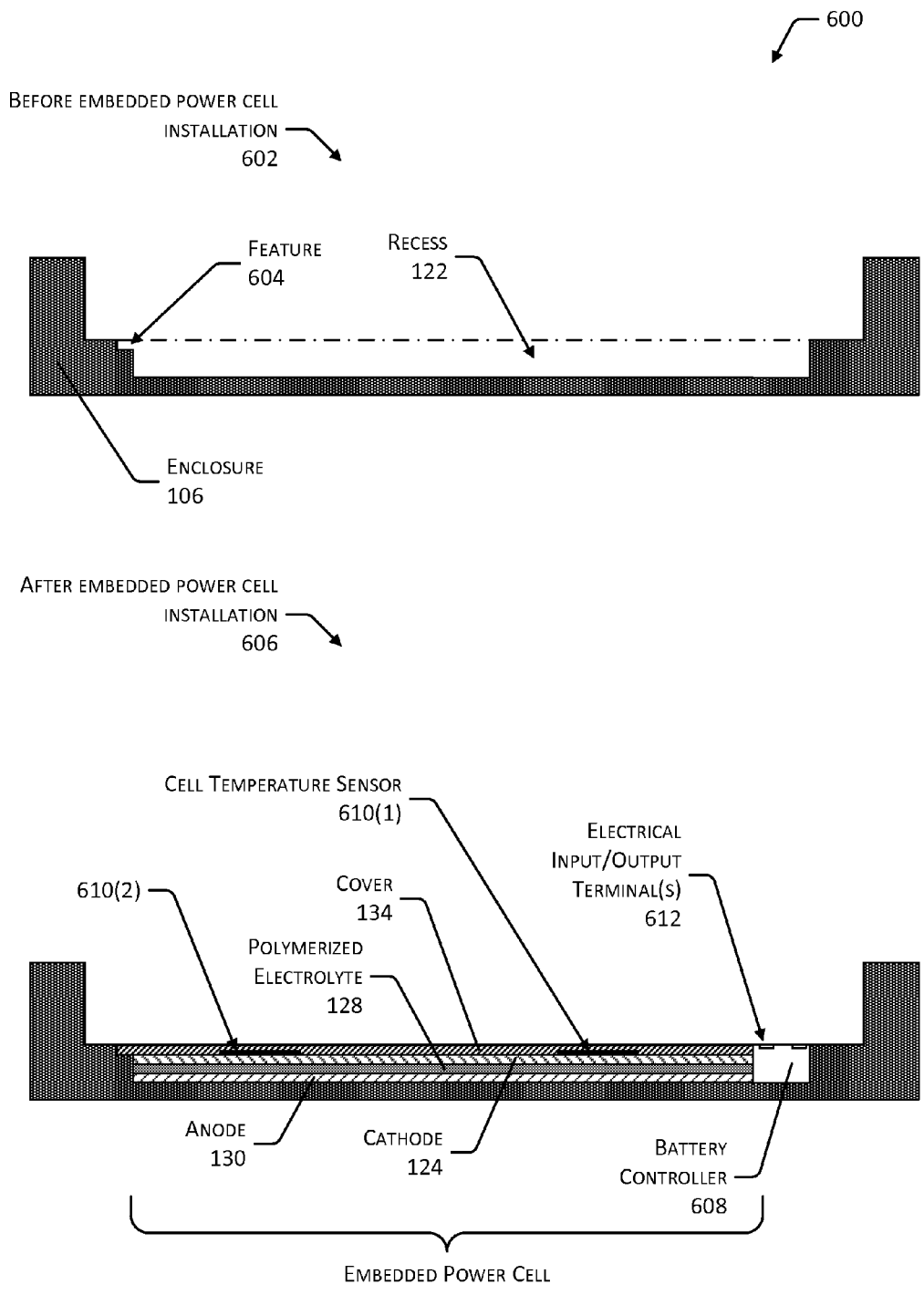
FIG. 6 is a side view of an embedded power cell and associated battery controller embedded within a recess of an enclosure.

FIG. 6 is a side view 600 of the embedded power cell 120 and associated components embedded within a single recess 122 in the enclosure 106. The enclosure 106 is depicted before embedded power cell installation 602. The enclosure 106 may be configured with one or more features 604, such as a lip, ridge, channel, and so forth, which facilitates coupling with the cover 134.

After the embedded power cell installation 606 the embedded power cell 120 is depicted. In this illustration, the anode 130 has been placed in the recess 122 in a position which is closer to the exterior of the enclosure 106, while the cathode 124 is proximate to the interior surface of the enclosure 106. Also depicted within the recess 122 are a battery controller 608 and a pair of temperature sensors 610(1) and 610(2). In some implementations no temperature sensor 610 may be present, or more than two may be provided.

The battery controller 608 may be configured to provide functions such as controlling charge and discharge of the embedded power cell 120. The battery controller 608 may also be configured to monitor health and operation of the embedded power cell 120. For example, the battery controller 608 may be coupled with the cell temperature sensors 610 and may control charge, discharge, or both based at least in part on the detected temperature.

As depicted here, in some implementations the anode 130 and the cathode 124 may be coupled within the recess 122 to the battery controller 608. The battery controller 608 may in turn provide electrical input/output terminals 612 which are then coupled to the electronics 114 using contacts such as the first contact 116 and the second contact 118. As described above, in some implementations the embedded power cell 120 may comprise multiple cathodes 124, polymerized electrolytes 128 or other electrolyte 506, anodes 130, and so forth.

Figure 7:
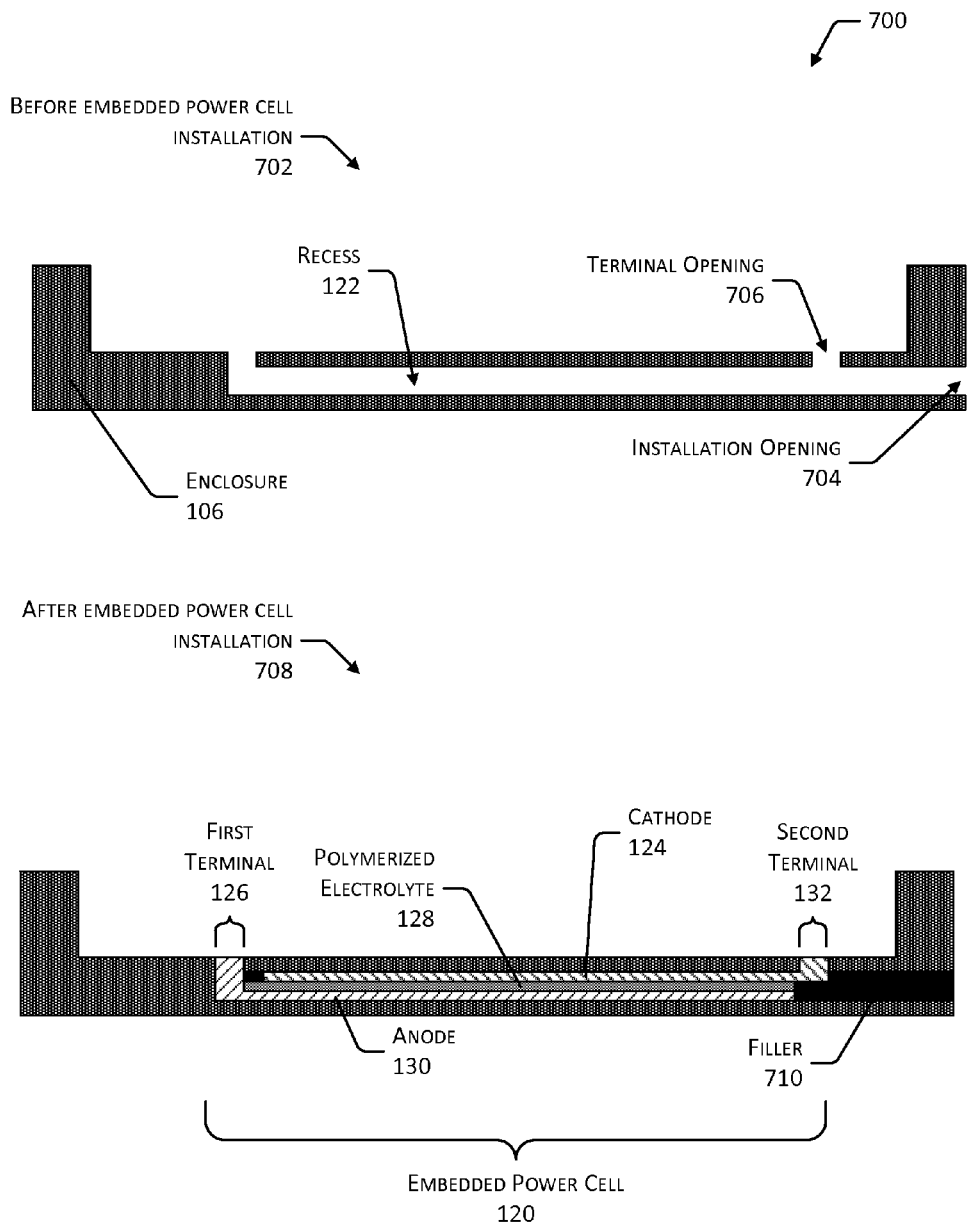
FIG. 7 is a side view of an embedded power cell which is emplaced into an enclosure through an aperture on an exterior surface of the enclosure.

FIG. 7 is a side view 700 of another implementation of the embedded power cell 120. The enclosure 106 is depicted before embedded power cell installation 702. The recess 122 is formed within the enclosure 106, with an installation opening 704 which opens through an exterior of the enclosure 106. For example, the recess 122 may be a slot in the enclosure 106. The embedded power cell 120 or the portions thereof may be inserted into the recess 122 through the installation opening 704.

One or more terminal openings 706 may extend from an interior surface of the enclosure 106 to the recess 122, providing a pathway for components in the recess 122 to couple to the components within the enclosure 106. For example, the first terminal 126 and the second terminal 132 may extend from the recess 122 through the terminal openings 706. In some implementations the first terminal 126, the second terminal 132, or both comprise additional pieces such as tabs, posts. These pieces may be inserted from the interior side of the enclosure 106 through the terminal openings 706 to make contact with corresponding portions of the embedded power cell 120 to provide an electrically conductive path.

After the embedded power cell installation 708 the embedded power cell 120 is depicted within the recess 122. A filler 710 may be inserted into the installation opening 704 to seal the recess 122. The filler 710 may comprise a solid material such as a plug, a material which will harden such as an epoxy, and so forth. In some implementations the battery controller 608 or other components may be placed within at least a portion of the volume with the filler 710.

Figure 8:
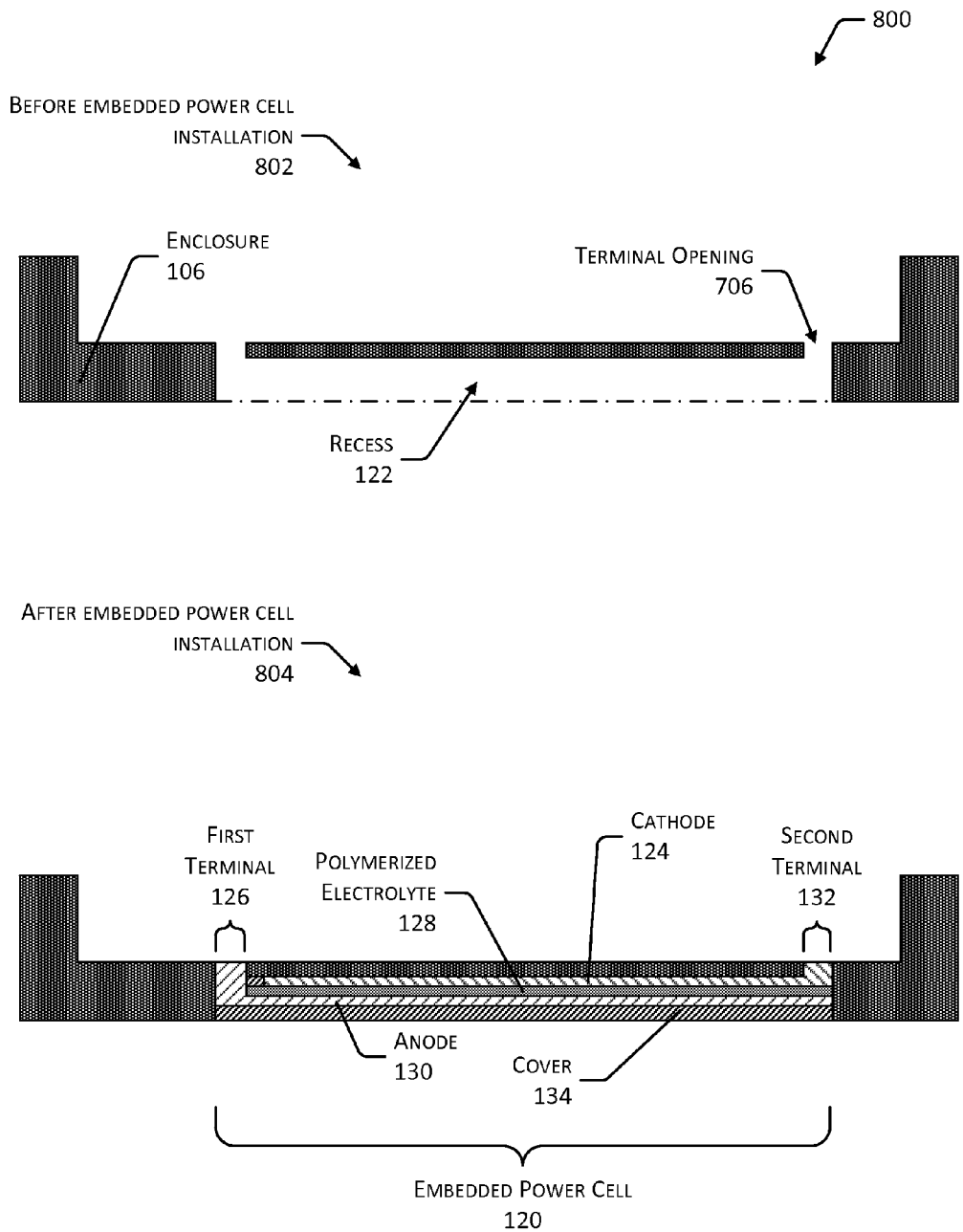
FIG. 8 is a side view of an embedded power cell which is emplaced into a recess which opens to an exterior of the enclosure.

FIG. 8 is a side view 800 of an embedded power cell which is emplaced into a recess which opens to an exterior of the enclosure. The enclosure 106 is depicted before embedded power cell installation 802. As illustrated, the recess 122 opens towards the exterior of the enclosure 106. One or more terminal openings 706 may be provided to allow for installation of electrically conductive pathways between the components on the interior of the device 102 and the embedded power cell 120. As shown in the view after embedded power cell installation 804, once the cathode 124, the polymerized electrolyte 128, and the anode 130 are emplaced, the embedded power cell 120 may be sealed into the recess 122 using the cover 134.

In addition to, or instead of, galvanic cells, in other implementations the embedded power cell 120 may comprise other types of energy sources or storage devices. These source or storage devices may include fuel cells, capacitors, betavoltaic generators, alphavoltaic generators, and so forth.

Figure 9:
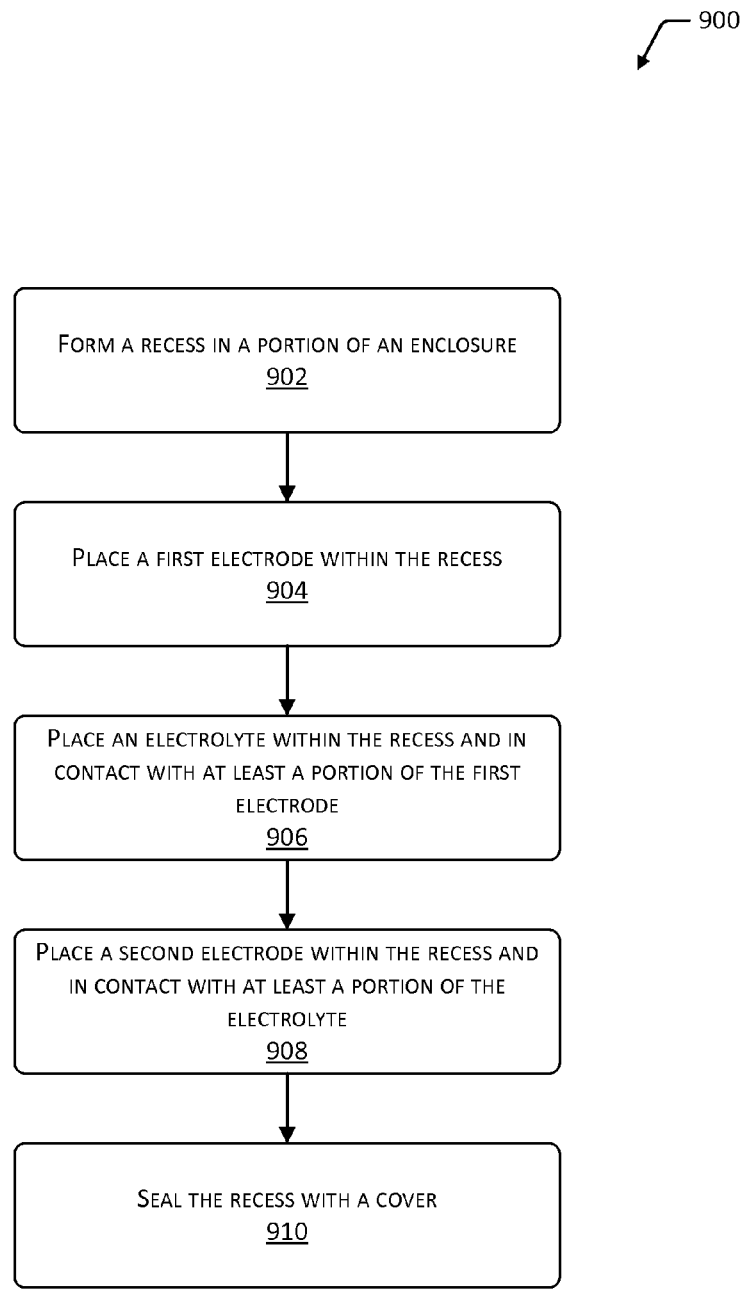
FIG. 9 is a flow diagram of a process of constructing an embedded power cell.

FIG. 9 is a flow diagram 900 of a process of constructing the embedded power cell 120. This process may be implemented using one or more manual operations, automated operations, or a combination thereof.

Block 902 forms one or more recesses 122 in a portion of the enclosure 106. For example, the recess 122 may be milled into the enclosure 106 using a cutting tool. The enclosure 106 may also be formed using other techniques or processes including but not limited to vacuum forming, injection molding, die forming, selective deposition, sintering, photopolymerization, and so forth. For example, a 3D printing device may form the enclosure 106 with the recess 122 using an additive process.

As used in the following blocks, placing may include one or more techniques or processes used to place physical material in a particular location. Placing may include physical installation, pouring, filling, printing, vapor deposition, lamination, spraying, jet deposition, and so forth.

Block 904 places a first electrode within the recess 122. For example, a film of aluminum, copper, or another metal may be laminated to the enclosure 106. The first electrode may comprise the cathode 124 or the anode 130.

Block 906 places an electrolyte within the recess 122 and in contact with at least a portion of the first electrode. As described above, the electrolyte may be the polymerized electrolyte 128, or a non-polymerized electrolyte 506. The polymerized electrolyte 128 may be applied as one or more pieces, or may be injected or otherwise applied as a liquid or a gel into the recess 122. The polymerized electrolyte 128 may be configured to polymerize upon application of one or more of light, heat, pressure, chemical process, and so forth. In some implementations the electrolyte may polymerize over time.

Block 908 places a second electrode within the recess 122 and in contact with at least a portion of the electrolyte. The second electrode may comprise the anode 130 or the cathode 124.

Additional materials may be placed between the electrodes and the electrolyte. For example, lithium in the form of a slurry or coating may be deposited on an aluminum film of the cathode 124 between the cathode 124 and the electrolyte. The lithium may be in a pure form or a chemical compound. In one implementation the lithium may comprise the chemical compound $LiCoO_2$.

Block 910 places the cover 134 over at least a portion of the recess 122. For example, the cover 134 may be configured to seal the recess 122 while leaving the first terminal 126 and the second terminal 132 exposed for coupling to the first contact 116 and the second contact 118, respectively. As described above, the sealing may use adhesives, lamination, ultrasonic welding, laser welding, and so forth.

In another implementation, the electrodes and the electrolyte may be joined together before placement into the recess 122. For example, the cathode 124, the polymerized electrolyte 128, and the anode 130 may be placed into a stack and inserted into the recess 122.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques and mechanisms described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
   an enclosure including at least one electrically non-conductive material, the enclosure having an interior surface;
   a recess opening into the interior surface of the enclosure;
   a power cell including:
      a cathode arranged within the recess;
      a polymerized electrolyte arranged within the recess and in contact with at least a portion of the cathode; and
      an anode arranged within the recess and in contact with at least a portion of the polymerized electrolyte;
   a cover sealed to at least a portion of the recess with an adhesive material, the cover configured to provide a barrier between an ambient atmosphere surrounding the device and the cathode, the polymerized electrolyte, and the anode within the recess, wherein the cover is positioned flush with the interior surface of the enclosure to separate the recess from a remainder of the enclosure; and
   one or more electronic devices positioned within the enclosure in electrical communication with and receiving power from the power cell.

2. The device of claim 1, wherein:
   the cathode comprises aluminum coated with $LiCoO_2$ or $LiMn_2O_4$,
   the anode comprises copper coated with carbon, and
   the polymerized electrolyte comprises polyvinylidene fluoride.

3. The device of claim 1, further comprising a pair of electrical terminals, the terminals comprising:
   a first portion of the cathode and a first portion of the anode, the first portion of the cathode and the first portion of the anode positioned within the recess; and
   a second portion of the cathode and a second portion of the anode which extend beyond the cover and the interior surface into the remainder of the enclosure, wherein at least one of the terminals is in electrical communication with at least one of the one or more electronic devices.

4. A device, comprising:
   an enclosure comprising one or more pieces;
   one or more recesses arranged on an interior surface of a portion of the enclosure, wherein each of the one or more recesses have one or more interior sides; and
   one or more embedded power cells arranged at least partly within the one or more recesses, wherein at least one of the one or more embedded power cells is configured to provide power to at least one electrical device arranged at least partly within the enclosure and external to the one or more recesses,
   the one or more embedded power cells including two or more electrodes, a first portion of the two or more electrodes arranged within the one or more recesses and in contact with at least one of the one or more interior sides, and a second portion of the two or more electrodes arranged external to the one or more recesses for providing the power to the at least one electrical device.

5. The device of claim 4, further comprising one or more layers of corrosion resistant material deposited within at least a portion of the recess.

6. The device of claim 4, wherein at least a portion of the one or more interior sides of each of the one or more recesses act as packaging for each of the one or more embedded power cells.

7. The device of claim 5, at least one of the one or more embedded power cells comprising the two or more electrodes and an electrolyte material configured as a galvanic cell, wherein at least a portion of the two or more electrodes is configured to seal the one or more recesses and separate the one or more recesses from a remainder of the enclosure.

8. The device of claim 7, further comprising a battery controller coupled to the at least one of the one or more embedded power cells and further arranged within the one or more recesses.

9. The device of claim 5, further comprising one or more covers coupled to the enclosure and configured to seal at least one of the one or more recesses, the seal providing a barrier between an ambient atmosphere surrounding the device and the one or more embedded power cells within the one or more recesses and separating the at least one of the one or more recesses from a remainder of the enclosure.

10. The device of claim 9, the enclosure comprising a first material and the one or more covers comprising a piece of a second material, wherein the first material and the second material are different.

11. The device of claim 4, wherein the enclosure includes a first region configured to contain one or more of the at least one electrical device or one or more heat sources associated with the at least one electrical device, and wherein the one or more recesses are positioned in a second region of the enclosure distal from the first region to reduce exposure of the one or more embedded power cells to heat from the first region.

12. The device of claim 4, wherein the enclosure includes a first region configured to contain one or more of the at least one electrical device or one or more heat sources associated with the at least one electrical device, and wherein the one or more recesses are positioned in a second region of the enclosure proximate to the first region, and wherein thermal energy from at least one of the one or more heat sources is coupled at least in part to at least a portion of the one or more embedded power cells.

13. A device, comprising:
an enclosure having an interior surface;
one or more recesses opening into the interior surface of a portion of the enclosure; and
one or more embedded power cells arranged at least partly within the one or more recesses, wherein at least a portion of each of the one or more recesses act as packaging for one or more of the one or more embedded power cells, wherein at least one of the one or more embedded power cells is configured to provide power to at least one electrical device arranged at least partly within the enclosure,
wherein an outer surface of the one or more embedded power cells is positioned flush with the interior surface of the enclosure.

14. The device of claim 13, further comprising a battery controller coupled to at least one of the one or more embedded power cells, wherein the battery controller is arranged at least partially within the one or more recesses.

15. The device of claim 13, the one or more embedded power cells comprising a polymerized electrolyte.

16. The device of claim 13, the one or more embedded power cells comprising:
a galvanic cell having two or more electrodes; and
an electrolyte material;
wherein:
   a first portion of the two or more electrodes is arranged within the one or more recesses and a second portion of the two or more electrodes is arranged external to the one or more recesses,
   the second portion of the two or more electrodes is configured to couple to the at least one electrical device, and
   at least a portion of at least one of the two or more electrodes seals the one or more recesses.

17. The device of claim 13, further comprising one or more covers coupled to the enclosure to seal the one or more embedded power cells within the one or more recesses, wherein the one or more covers are positioned flush with the interior surface of the enclosure to separate the one or more recesses from a remainder of the enclosure.

18. The device of claim 1, wherein the one or more electronic devices are positioned on a side of the cover external to the recess.

19. The device of claim 4, wherein an exterior surface of at least one of the one or more embedded power cells is positioned flush with the interior surface of the portion of the enclosure, the at least one of the one or more embedded power cells positioned on a first side of the cover within at least one of the one or more recesses, wherein a remainder of the enclosure on a second side of the cover external to the at least one of the one or more recesses is configured to contain the at least one electrical device.

20. The device of claim 4, the two or more electrodes including at least a portion of an anode and at least a portion of a cathode extending external to the one or more recesses, wherein at least one of the electrodes is configured to couple with the at least one electrical device.

* * * * *